United States Patent [19]

Shiihara

[11] Patent Number: 5,541,592
[45] Date of Patent: Jul. 30, 1996

[54] POSITIONING SYSTEM

[75] Inventor: Masahiro Shiihara, Fukuoka, Japan

[73] Assignee: Matsushita Electric Industrial Co., Inc., Osaka, Japan

[21] Appl. No.: 287,038

[22] Filed: Aug. 8, 1994

[30] Foreign Application Priority Data

Aug. 9, 1993 [JP] Japan .................. 5-197056

[51] Int. Cl.$^6$ .................. G08G 1/123
[52] U.S. Cl. .................. 340/990; 340/995/988; 364/424.01
[58] Field of Search .................. 340/990, 995, 340/980, 988; 364/449, 424.01, 424.02; 434/62

[56] References Cited

U.S. PATENT DOCUMENTS

| | | | |
|---|---|---|---|
| 5,084,822 | 1/1992 | Hayami | 340/995 |
| 5,089,826 | 2/1992 | Yano et al. | 340/995 |
| 5,093,669 | 3/1992 | Kajiyama | 340/995 |
| 5,243,528 | 9/1993 | Lefebure | 340/995 |
| 5,266,948 | 11/1993 | Matsumoto | 340/995 |

FOREIGN PATENT DOCUMENTS

| | | |
|---|---|---|
| 0369539 | 5/1990 | European Pat. Off. . |
| 0519593 | 12/1992 | European Pat. Off. . |
| 4305116 | 10/1992 | Japan . |

*Primary Examiner*—John K. Peng
*Assistant Examiner*—Benjamin C. Lee
*Attorney, Agent, or Firm*—Lowe, Price, LeBlanc

[57] ABSTRACT

A positioning system has a position measuring mode and a simulated navigation mode. In the position measuring mode, the system measures an actual position of a movable body. On the other hand, in the simulated navigation mode, a simulated position of the movable body is derived using a determined route to be traveled by the movable body. The system derives the simulated position of the movable body as a position which moves along the determined route at a given speed. The system displays the derived simulated position of the movable body at a center of a display screen, along with a corresponding map and the determined route in a superimposed fashion. Accordingly, the system automatically scrolls the corresponding map and route at a given speed, with the derived simulated position of the movable body being constantly displayed at the center of the display screen.

9 Claims, 4 Drawing Sheets

POSITIONING SYSTEM

BACKGROUND OF THE INVENTION

1. Field of the Invention

The present invention relates to a positioning system for a movable body, such as a car, for providing geographical information to a user, such as, a driver, and more specifically, to a positioning system having a simulated running mode where the user can experience a simulated running on a displayed map.

2. Description of the Prior Art

In recent positioning systems, a position of a movable body, such as a car, can be measured or derived using signals from satellites employed, such as, in the Global Positioning System.

One type of those positioning systems has a position measuring mode and a simulated running mode, one of which is selectable by a user's key operation. In the position measuring mode, a position of the movable body is derived based on signals from the satellites and displayed along with a corresponding map. On the other hand, in the simulated running mode, the user can experience a simulated running of the movable body on a display screen, along with a map which the user can select from stored map data or which is automatically selected by the system when the user designates a start point by a key operation. The user selects the simulated running mode in an attempt, for example, to experience in advance a simulated running from the start point to a destination point on the display screen.

However, in the conventional simulated running mode, the user has to scroll the displayed map using a cursor on the display screen. As appreciated, this manual operation of the cursor forces the user to do other than driving the movable body, which would raise a serious problem in view of safety and thus should be improved.

SUMMARY OF THE INVENTION

Therefore, it is an object of the present invention to provide a positioning system having a improved simulated running or navigation mode which does not require user attention to be diverter from driving a movable body.

According to one aspect of the present invention, a positioning system for a movable body comprises display means having a display screen; map data storing means for storing map data; route setting means for setting a route to be traveled by the movable body, the route having a start point and a destination point; mode selecting means, manually operable, for selecting a simulated navigation mode; simulated position deriving means, responsive to the mode selecting means selecting the simulated navigation mode, for deriving a simulated current position of the movable body based on the route set by the route setting means, the simulated position deriving means deriving the simulated current position as a position which moves along the route at a given speed from the start point toward the destination point; and control means for displaying the simulated current position on the display screen of the display means, along with the corresponding map data and route, the control means controlling the display means to display the simulated current position at a center of the display screen.

According to another aspect of the present invention, a positioning system for a movable body, wherein the positioning system has a first operation mode where a current position of the movable body is measured using sensor means and a second operation mode, comprises display means having a display screen; map data storing means for storing map data; route setting means for setting a route to be traveled by the movable body, the route having a start point and a destination point; mode selecting means, manually operable, for selecting one of the first and second operation modes; simulated position deriving means, responsive to the mode selecting means selecting the second operation mode, for deriving a simulated current position of the movable body based on the route set by the route setting means, the simulated position deriving means deriving the simulated current position as a position which moves along the route at a first given speed from the start point toward the destination point; and control means for displaying the simulated current position on the display screen of the display means, along with the corresponding map data and route, the control means controlling the display means to display the simulated current position at a center of the display screen so that the corresponding map data and route is scrolled along the route at a second given speed with the simulated current position being constantly displayed at the center of the display screen, the second given speed being determined by the first given speed.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to limit the present invention.

In the drawings.

DESCRIPTION OF THE PREFERRED EMBODIMENT

Now, a preferred embodiment of the present invention will be described hereinbelow with reference to the accompanying drawings.

Figure 1:
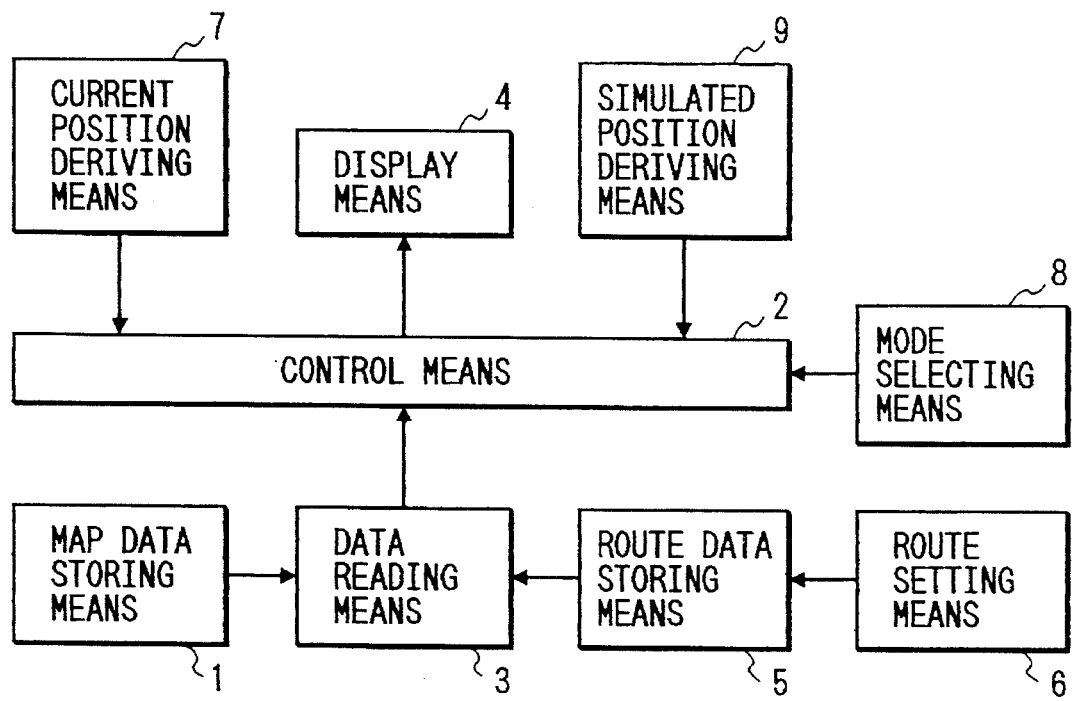
FIG. 1 is a functional block diagram showing a structure of a positioning system according to a preferred embodiment of the present invention.

FIG. 1 is a functional block diagram showing a structure of a positioning system according to the preferred embodiment of the present invention. In FIG. 1, map data storing means 1 stores map data including road data, and control means 2 controls data reading means 3 to read out necessary map data from the map data storing means 1 for a display on display means 4. Route data storing means 5 stores route data determined or set by route setting means 6. Specifically, the route setting means 6 sets a route to be traveled by a movable body, i.e. a car in this preferred embodiment, in the form of a series or chain of points, that is, a start point, a target or destination point and passing or transit points therebetween. The route setting method is well known in the art. For example, the route may be automatically set by inputting start and destination points into the system via a user's key operation, or the route may be set by inputting start and destination points and all transit points therebetween via the user's key operation. The set route is stored by the route data storing means 5 in the form of positional data, that is, longitude and latitude data of each of the start, transit and destination points forming the travel route. The route data stored in the route data storing means 5 is also read out by the data reading means 3 under the control by the control means 2 for a display on the display means 4 along with the foregoing map data.

Current position deriving means 7 derives a current position of the car based on signals received from satellites employed, such as, in the Global Positioning System. Since the derivation of the current car position using the satellite signals is well known in the art, no further explanation will be made therefor. The control means 2 controls the display means 4 to display the current car position derived by the current position deriving means 7 when a position measuring mode is selected by mode selecting means 8. Specifically, when the position measuring mode is selected by the mode selecting means 8 via the user's key operation, the control means 2 controls the current position deriving means 7 to derive the current car position and further controls the display means 4 to display the derived car position along with the corresponding map data (and the travel route if set) read out by the data reading means 3. Such a display itself of the derived car position is also well known in the art.

The positioning system according to this preferred embodiment further includes simulated position deriving means 9 which derives an imaginary or simulated current position of the car when a simulated running or navigation mode is selected by the mode selecting means 8. Specifically, when the simulated navigation mode is selected by the mode selecting means 8 via the user's key operation, the control means 2 controls the simulated position deriving means 9 to derive the simulated current car position based on the travel route read out by the data reading means 3 from the route data storing means 5, and further controls the display means 4 to display the derived simulated car position along with the corresponding map and travel route read out by the data reading means 3. The control means 2 controls the display means 4 to scroll the displayed image, that is, the displayed map and travel route, at a given speed and along the travel route, with the derived simulated car position being always displayed at a center of the displayed image or the display screen.

Figure 2:
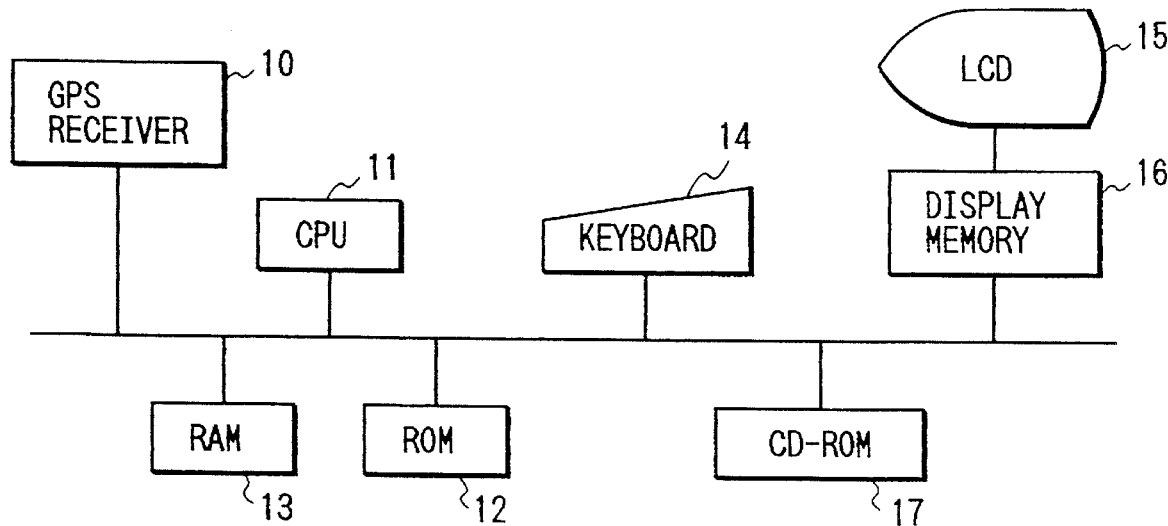
FIG. 2 is a circuit block diagram of the positioning system shown in FIG. 1.

FIG. 2 is a circuit block diagram of the positioning system shown in FIG. 1. In FIG. 2, numeral 10 represents a GPS receiver for receiving the signals from the satellites in the Global Positioning System. Accordingly, the GPS receiver 10 constitutes a part of the current position deriving means 7 in FIG. 1. Numeral 11 denotes a CPU (central processing unit) and numeral 12 denotes a ROM (read-only memory) which stores various programs to be executed by the CPU 11. The current position deriving means 7 (except for the GPS receiver 10), the route setting means 6 (except for a manually operative section), and the simulated position deriving means 9 are realized by the CPU 11 when executing the corresponding programs stored in the ROM 12. The data reading means 3 is also realized by the CPU 11 when executing a corresponding step in the program. Numeral 13 denotes a RAM (random access memory) which provides a working area for the CPU 11 to execute the program read out from the ROM 12. The RAM 13 realizes the route data storing means 5. Numeral 14 denotes a keyboard for inputting instructions and data into the system. The keyboard 14 realizes the mode selecting means 8 and the manually operative section of the route setting means 6. Numerals 15 and 16 denote an LCD (liquid crystal display) and a display memory for writing data to be displayed on the LCD 15, respectively. The LCD 15 and the display memory 16 cooperatively realize the display means 4. Numeral 17 denotes a CD-ROM (compact disk read-only memory) which realizes the map data storing means 1.

The positioning system as structured above operates in a manner as described hereinbelow. Since an operation of the positioning system in the position measuring mode as selected by the mode selecting means 8, i.e. by the user's manual operation on the keyboard 14, is well known in the art, only an operation of the positioning system in the simulated navigation mode as selected by the user will be described hereinbelow.

When the user selects the simulated navigation mode using the keyboard 14, the simulated navigation mode is started. Specifically, the system gets in a standby state for receiving the start and destination points to be inputted by the user using the keyboard 14 in the known manner. When the start and destination points are inputted, the route setting means 6 automatically sets a travel route from the start point to the destination point, which is then stored by the route data storing means 5.

Figure 3:
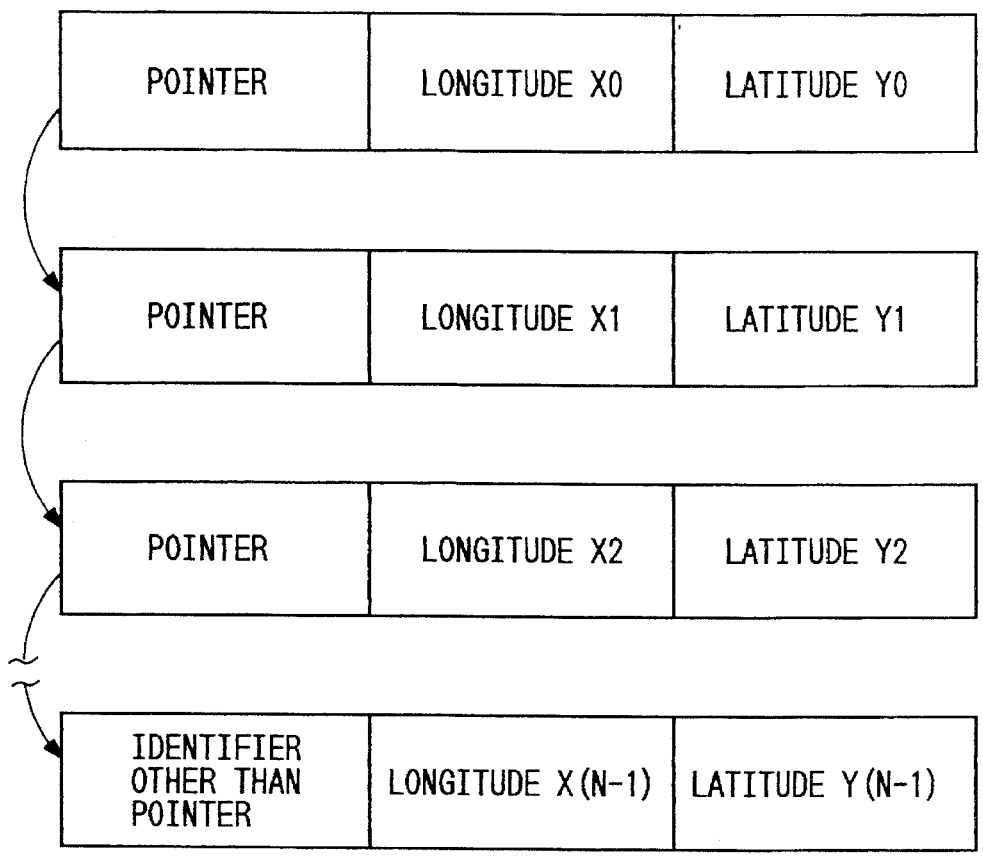
FIG. 3 is a diagram showing an example of a travel route stored in the form of longitudes and latitudes of points forming the travel route.

As described before, the travel route thus determined is identified by a chain of the points (the start and destination points and the transit points therebetween), and each point is identified by the corresponding longitude and latitude. For example, FIG. 3 shows one known example of the stored travel route, wherein the number of points is N, wherein a point identified by "longitude X0, latitude Y0" represents the start point, a point identified by "longitude X(N−1), latitude Y(N−1)" represents the destination point, and points therebetween represent the transit points, respectively, and wherein "pointer" means that a next point exists. Accordingly, as shown in FIG. 4, the travel route is in the form of a polygonal line having segments AB, BC, CD and DE, wherein the point A corresponds to the start point (X0, Y0), the point E corresponds to the destination point (X(N−1), Y(N−1)) and the points B, C and D correspond to the transit points therebetween in FIG. 3.

Figure 5:
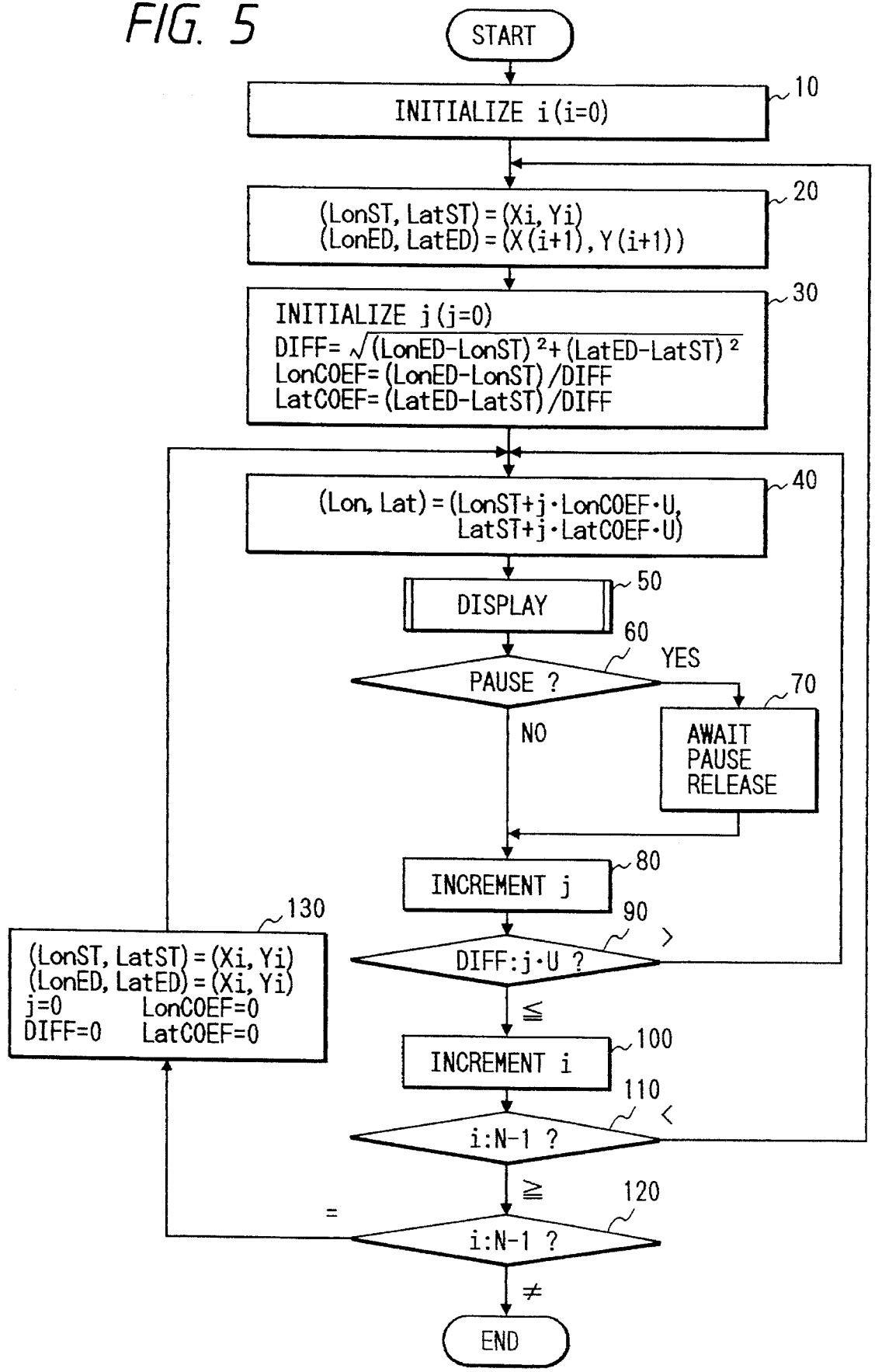
FIG. 5 is a flowchart of a simulated navigation routine to be executed by a CPU in a simulated navigation mode to provide a simulated navigation to a user.

FIG. 5 is a flowchart of a simulated navigation routine executed by the CPU 11 in the simulated navigation mode. The CPU starts to execute this routine when the travel route is determined as described above.

Figure 4:
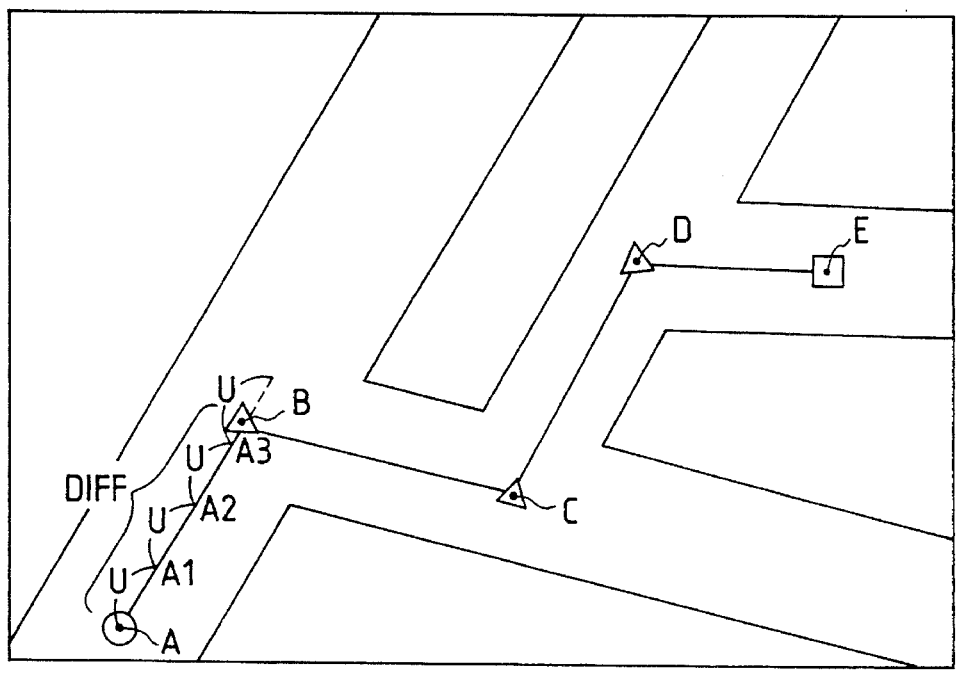
FIG. 4 is a diagram for explaining an operation of the positioning system shown in FIG. 1.

In the flowchart of FIG. 5, the determined travel route includes, for example, the start point A, the transit points B, C and D and the destination point E as shown in FIG. 4 for simplifying the description and the number of those points is represented by N.

In FIG. 5, at step 10, the CPU 11 initializes a data managing variable i (=0, 1, . . . ) to a value "0". The data managing variable i is used to identify one of the segments from AB to DE in sequence, which will be well understood from a later description.

Subsequently, the routine proceeds to step 20 which sets a position deriving start point (LonST, LatST)=(Xi, Yi) and a position deriving end point (LonED, LatED)=(X(i+1), Y(i+1)). As appreciated, in FIG. 4, the position deriving start point (LonST, LatST)=(Xi, Yi) represents the point A when i=0, and the position deriving end point (LonED, LatED)= (X(i+1), Y(i+1)) represents the point B when i=0. Accordingly, when "i" is updated or incremented at later step 100, the position deriving start point is updated or shifted to B, C and D in sequence, and the position deriving end point is updated or shifted to C, D and E in sequence.

Subsequently, the routine proceeds to step 30 which initializes a simulated position deriving variable j (=0, 1, ...). The variable j is used for identifying a simulated car position between the position deriving start and end points set at step 20 and is updated or incremented by "1" every time this simulated navigation routine is executed. Step 30 further derives a longitude/latitude difference DIFF between the position deriving start and end points derived at step 20, based on an equation as follows:

$$DIFF = \sqrt{(LonED - LonST)^2 + (LatED - LatST)^2}$$

As appreciated from the above equation, DIFF represents a distance between the position deriving start and end points set at step 20.

Step 30 further derives a longitude deriving coefficient LonCOEF and a latitude deriving coefficient LatCOEF based on equations as follows:

$$LonCOEF = (LonED-LonST)/DIFF$$

$$LatCOEF = (LatED-LatST)/DIFF$$

As appreciated, LonCOEF represents a rate of a variation of a longitude relative to a variation of DIFF while LatCOEF represents a rate of a variation of a latitude relative to a variation of DIFF.

Thereafter, the routine proceeds to step 40 which derives a simulated current car position (Lon, Lat) based on an equation as follows:

$$(Lon, Lat) = (LonST + j \cdot LonCOEF \cdot U, LatST + j \cdot LatCOEF \cdot U)$$

In the above equation, U represents a unit distance or interval updated every time this simulated navigation routine is executed. Accordingly, j•U represents a distance traveled by the car from the position deriving start point derived at step 20, and j•LonCOEF•U and j•LatCOEF•U represent corresponding variations in longitude and latitude from LonST and LatST, respectively.

In this preferred embodiment, the user can set a magnitude of U using the keyboard 14. Accordingly, the user can enjoy the simulated navigation at his/her desired car speed. For example, when this simulated navigation routine is executed per 1 second, that is, the variable j is updated by "1" per 1 second at later step 80, and when U is set to 10 meters by the user's key operation on the keyboard 14, the user can enjoy the simulated navigation at an average speed of 36 km/h.

Figure 6:
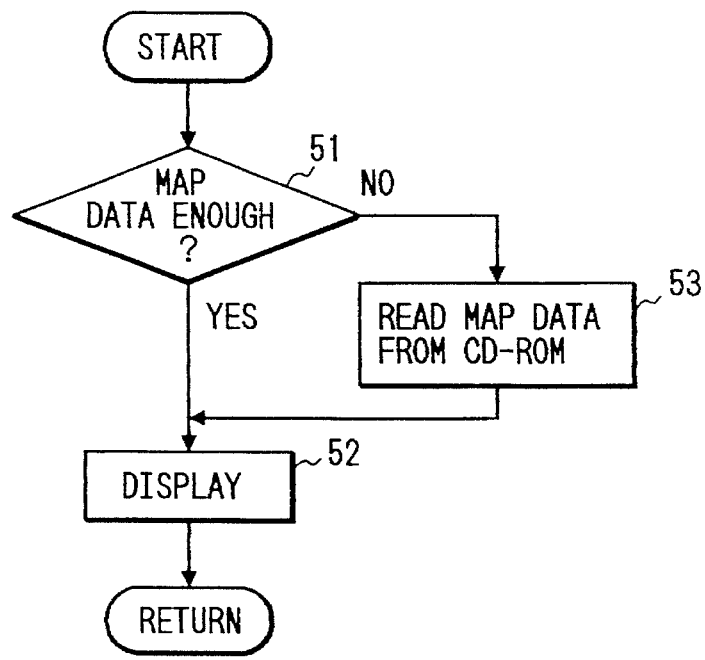
FIG. 6 is a flowchart of a subroutine corresponding to step 50 in FIG. 5.

Subsequently, the routine proceeds to step 50 where the simulated car position derived at step 40 is displayed at the center on a display screen of the LCD 15, along with the corresponding map and the determined travel route in a superimposed fashion. Specifically, referring to FIG. 6 showing a subroutine corresponding to step 50 in FIG. 5, step 51 determines whether map data sufficient to show the derived simulated car position at the center of the corresponding map on the display screen is prepared in the display memory 16. When the map data stored in the display memory 16 is determined to be sufficient, the routine proceeds to step 52 where the derived simulated car position is displayed at the center of the displayed image, that is, at the center of the corresponding map along with the determined travel route in the superimposed fashion. On the other hand, when the map data stored in the display memory 16 is determined to be not sufficient, the routine proceeds to step 53 where the CPU 11 reads out the lacking map data from the CD-ROM 17 for transfer to the display memory 16. Thereafter, the routine proceeds to step 52 where the derived simulated car position is displayed in the manner as described above.

From step 52 in FIG. 6, the routine proceeds to step 60 in FIG. 5 which determines whether "pause" is required by the user. When "pause" is required by the user, the routine proceeds to step 70 which awaits "pause release" from the user. Specifically, the user can require the system to "pause" via the key operation on the keyboard 14 so that the user can watch the displayed image as a static or standstill image for a desired time period. As appreciated, "pause release" is also inputted by the user's key operation on the keyboard 14.

On the other hand, when "pause" is not required at step 60, the routine proceeds to step 80 where the variable j is incremented by "1". Subsequently, step 90 compares j•U with DIFF derived at step 30. As described before, j•U represents a simulated distance traveled by the car from the position deriving start point set at step 20, and DIFF represents a distance between the position deriving start and end points set at step 20. Accordingly, step 90 determines whether a simulated car position to be derived at a next execution cycle of this routine, that is, of step 40, will exist on the segment defined between the position deriving start and end points set at step 20. For example, when i=0 so that the position deriving start and end points are A and B in FIG. 4, respectively, and when the variable j is incremented to "4" at step 80, there will be no point on the segment AB for a simulated car position to be derived in the next execution cycle of this routine. As appreciated, in FIG. 4, A1, A2 and A3 represent simulated car positions corresponding to j=1, j=2 and j=3, respectively.

Accordingly, while DIFF>j•U, steps 40 to 80 are repeated. On the other hand, when j•U becomes equal to or greater than DIFF, the routine proceeds to step 100 where the variable i is incremented by "1". Subsequently, step 110 compares the variable i with a value "N−1". Since the variable i starts from "0" and N represents the number of the points on the determined travel route, step 110 determines whether a simulated car position to be derived in the next execution cycle of this routine reaches or exceeds the destination point, that is, the point E in FIG. 4. When i<N−1 at step 110, the routine proceeds to step 20 where position deriving start and end points are newly set for a next segment of the travel route. For example, when the current position deriving start and end points are A and B in FIG. 4, respectively, next position deriving start and end points to be set at step 20 are B and C in FIG. 4, respectively. Subsequently, the routine proceeds to step 30 where DIFF, LonCOEF and LatCOEF are derived for the segment BC, and steps 40 to 80 are repeated while DIFF>j•U.

As appreciated from the foregoing description, since the simulated car position is derived in sequence along the determined travel route and displayed so as to be constantly located at the center of the displayed image on the display screen, the displayed image, that is, the displayed map and travel route, is automatically scrolled along the determined travel route with the simulated car position constantly located at the center of the displayed image. The displayed image is scrolled at a constant speed which can be determined by the user by setting the unit distance U to a desired value as described before.

Referring back to step 110, when the variable i becomes equal to or greater than the value "N–1", the routine proceeds to step 120 which determines whether the variable i is equal to the value "N–1" or not. When i=N–1, the routine proceeds to step 130 which performs the following setting of the associated values:

(LonST, LatST)=(Xi, Yi)
(LonED, LatED)=(Xi, Yi)
j=0
DIFF=0
LonCOEF=0
LatCOEF=0

The routine now proceeds to step 40 where a simulated car position is derived at the destination point, that is, the point E in FIG. 4. Accordingly, step 50 displays the destination point at the center of the displayed image as described above. When "pause" is required by the user at step 60, the displayed image is continued to be shown until "pause" is released at step 70. Thereafter, the routine proceeds through to step 120 which this time determines that the variable i is not the value "N–1". Accordingly, this simulated navigation routine is terminated, and a proper indication showing the termination of the simulated navigation routine may be displayed on the LCD 15 for the user.

Figure 7:
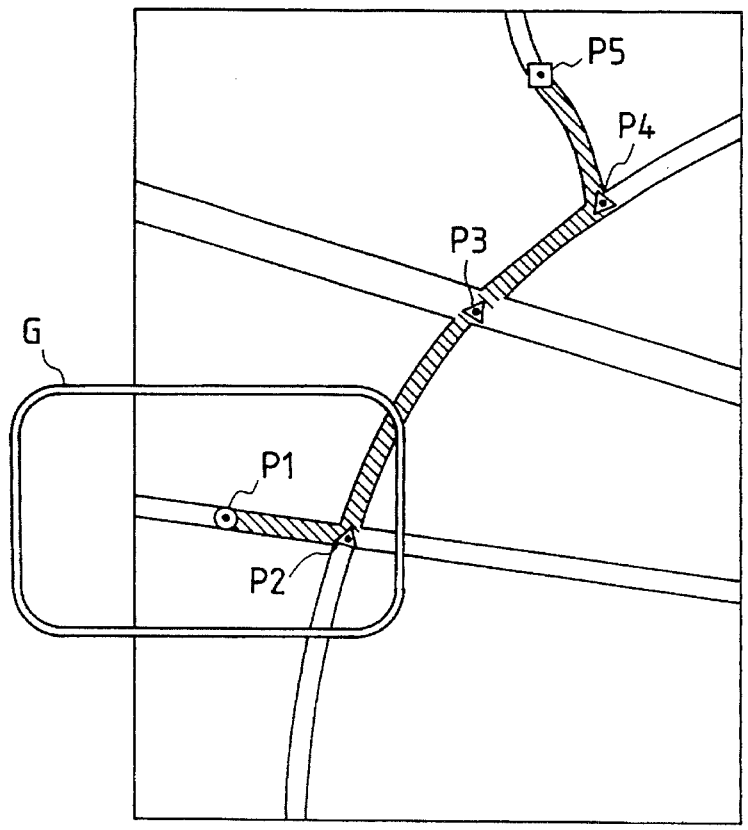
FIG. 7 is a diagram for explaining a display manner realized by executing the simulated navigation routine of FIGS. 5 and 6.

FIG. 7 is a diagram for explaining the display manner realized by executing the foregoing simulated navigation routine.

FIG. 7 shows a map including roads and the determined travel route which is hatched and assigned P1 to P5 in sequence along the travel route. As appreciated, P1 represents the start point, P2 to P4 represent the transit points, respectively, and P5 represents the destination point. In FIG. 7, G represents a frame of the display screen of the LCD 15.

When the simulated navigation routine is executed, the start point P1 is first displayed at the center of the display screen of the LCD 15. Subsequently, the LCD 15 scrolls the displayed image along the travel route from the start point P1 to the transit point P2 with the derived simulated car position constantly located at the center of the display screen. Subsequently, the LCD 15 scrolls the displayed image in the same manner along the travel route from the transit point P2 to the transit point P3, from the transit point P3 to the transit point P4 and from the transit point P4 to the destination point P5. Finally, the LCD 15 stops scrolling when the destination point P5 is displayed at the center of the display screen. Accordingly, the map from the start point P1 to the destination point P5 can be automatically displayed or scrolled in sequence so that the user can enjoy the simulated navigation in advance.

It is to be understood that this invention is not to be limited to the preferred embodiments and modifications described above, and that various changes and modifications may be made without departing from the spirit and scope of the invention as defined in the appended claims.

What is claimed is:

1. A positioning system for a movable body, said positioning system having a first operation mode where a current position of the movable body is measured using sensor means, said positioning system further having a second operation mode, said positioning system comprising:

display means having a display screen;

map data storing means for storing map data;

route setting means for setting a route to be traveled by the movable body, said route having a start point and a destination point;

mode selecting means, manually operable, for selecting one of said first and second operation modes;

simulated position deriving means, responsive to said mode selecting means selecting said operation mode, for deriving a simulated current position of the movable body based on said route set by the route setting means, said simulated position deriving means deriving said simulated current position as a position which moves along said route at a given simulated speed from said start point toward said destination point; and control means for displaying said derived simulated current position on the display screen of said display means, along with the corresponding map data and route, said control means controlling said display means to display said derived simulated current position at a given position on said display screen so that said corresponding map data and route is scrolled along said display screen at a given scroll speed with said derived simulated current position being constantly displayed at said given position, said given scroll speed being determined by said given simulated speed, whereby display of movement of said simulated current position along said route at said given scroll speed is provided without scrolling of said corresponding map data and route by a user.

2. The positioning system as set forth in claim 1, wherein said sensor means includes a plurality of satellites and wherein said system measures said current position of the movable body using signals from said plurality of the satellites.

3. The positioning system as set forth in claim 1, further comprising means, manually operable, for setting said given simulated speed to a desired value.

4. The positioning system as set forth in claim 1, further comprising means, manually operable, for pausing said simulated position deriving means so as to bring the displayed image into a standstill.

5. The positioning system as set forth in claim 1, further comprising means, manually operable, for pausing said simulated position deriving means so that said control means controls said display means to display said corresponding map data and route in a static manner along with said derived simulated current position located at said center.

6. A positioning system for a movable body comprising:

display means having a display screen;

map data storing means for storing map data;

route setting means for setting a route to be traveled by the movable body, said route having a start point and a destination point;

mode selecting means, manually operable, for selecting a simulated navigation mode;

simulated position deriving means, responsive to said mode selecting means selecting said simulated navigation mode, for deriving a simulated current position of the movable body based on said route set by the route setting means, said simulated position deriving means deriving said simulated current position as a position which moves along said route at a given speed from said start point toward said destination point; and control means for displaying said derived simulated current position on the display screen of said display means, along with the corresponding map data and route, said control means controlling said display means to display said derived simulated current position at a given position on said display screen, whereby display of simulated movement of said simulated current position along said route is provided without scrolling of a displayed image by a user.

7. The positioning system as set forth in claim 6, further comprising means, manually operable, for variably setting said given speed.

8. The positioning system as set forth in claim 6, further comprising means, manually operable, for pausing said simulated position deriving means so as to bring the displayed image into a standstill.

9. The positioning system as set forth in claim 6, further comprising means, manually operable, for pausing said simulated position deriving means so that said control means controls said display means to display said corresponding map data and route in a static manner along with said derived simulated current position located at said center.

* * * * *